(12) United States Patent
Kashima et al.

(10) Patent No.: US 8,701,300 B2
(45) Date of Patent: Apr. 22, 2014

(54) MEASUREMENT APPARATUS, MEASUREMENT METHOD, PROGRAM, AND RECORDING MEDIUM

(75) Inventors: Koji Kashima, Kanagawa (JP); Tatsumi Sakaguchi, Kanagawa (JP); Hiroshi Kajihata, Tokyo (JP)

(73) Assignee: Sony Corporation, Tokyo (JP)

( * ) Notice: Subject to any disclaimer, the term of this patent is extended or adjusted under 35 U.S.C. 154(b) by 164 days.

(21) Appl. No.: 13/459,425

(22) Filed: Apr. 30, 2012

(65) Prior Publication Data

US 2012/0285025 A1  Nov. 15, 2012

(30) Foreign Application Priority Data

May 13, 2011 (JP) ................................. 2011-108119

(51) Int. Cl.
*A61B 5/103* (2006.01)
*G01B 3/34* (2006.01)

(52) U.S. Cl.
USPC .......................... 33/514.2; 33/1 N; 33/555.4

(58) Field of Classification Search
USPC ............ 33/1 N, 511, 512, 514.1, 514, 2, 534, 33/555.4; 600/587
See application file for complete search history.

(56) References Cited

U.S. PATENT DOCUMENTS

| 2,637,907 | A  | * | 5/1953  | Aubrey et al. ............... 33/555.4 |
|-----------|----|---|---------|--------------------------------------|
| 3,832,780 | A  | * | 9/1974  | Lewis .............................. 33/512 |
| 8,328,739 | B2 | * | 12/2012 | Eriksen ......................... 600/587 |
| 2003/0158501 | A1 | * | 8/2003  | Uchida et al. ................. 600/587 |
| 2005/0223580 | A1 | * | 10/2005 | Madsen .......................... 33/512 |
| 2006/0130347 | A1 | * | 6/2006  | Bergamasco et al. ........... 33/512 |
| 2010/0268120 | A1 | * | 10/2010 | Eriksen ......................... 600/587 |
| 2011/0060248 | A1 | * | 3/2011  | Ishida et al. .................. 600/587 |
| 2013/0172783 | A1 | * | 7/2013  | Ikits et al. .................... 600/587 |

FOREIGN PATENT DOCUMENTS

| JP | 2008-259746 A | 10/2008 |
|----|---------------|---------|
| JP | 2009-075013 A | 4/2009  |

* cited by examiner

*Primary Examiner* — G. Bradley Bennett
(74) *Attorney, Agent, or Firm* — Wolf, Greenfield & Sacks, P.C.

(57) ABSTRACT

In a band in which a plurality of members are connected to one another through joints serving as connection axes parallel to one another, an inter-panel angle indicating an angle between the members adjacent to each other through the joint is adjusted. Each joint is provided with an angular sensor for detecting the inter-panel angle. Based on the detected inter-panel angle, the peripheral shape indicating a shape of at least a part of a periphery of the object to be measured, on which the band is mounted, is measured. The present technology, for example, is useful for an abdominal girth measurement apparatus.

14 Claims, 16 Drawing Sheets

FIG.13
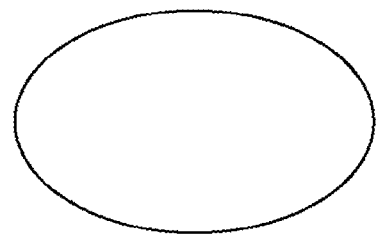
IDEAL OVAL
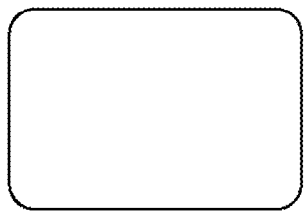
FLAT RECTANGLE
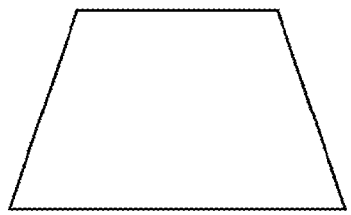
TRAPEZOID WITH DIFFERENT FRONT
AND REAR SIDES
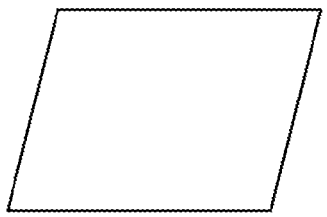
PARALLELOGRAM WITH DIFFERENT LEFT
AND RIGHT SIDES
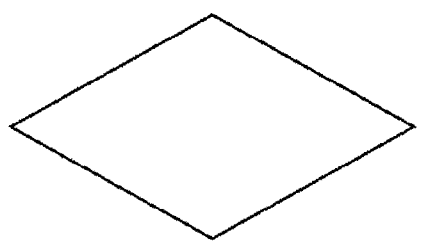
RHOMBOID WITH DEVELOPED MUSCLE

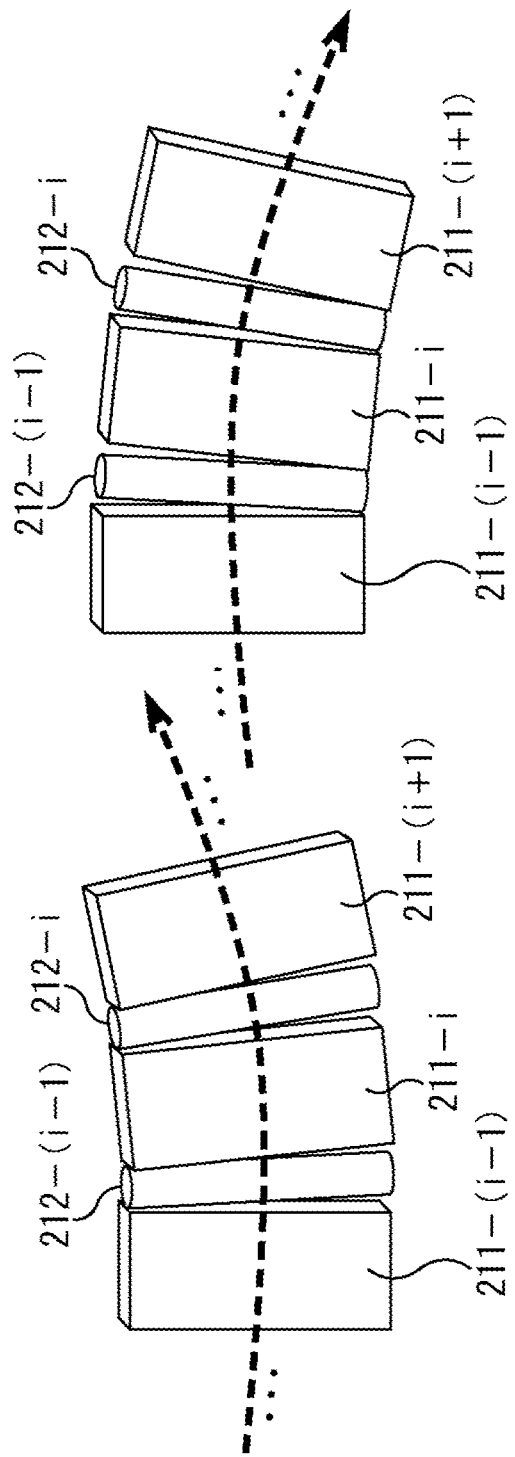

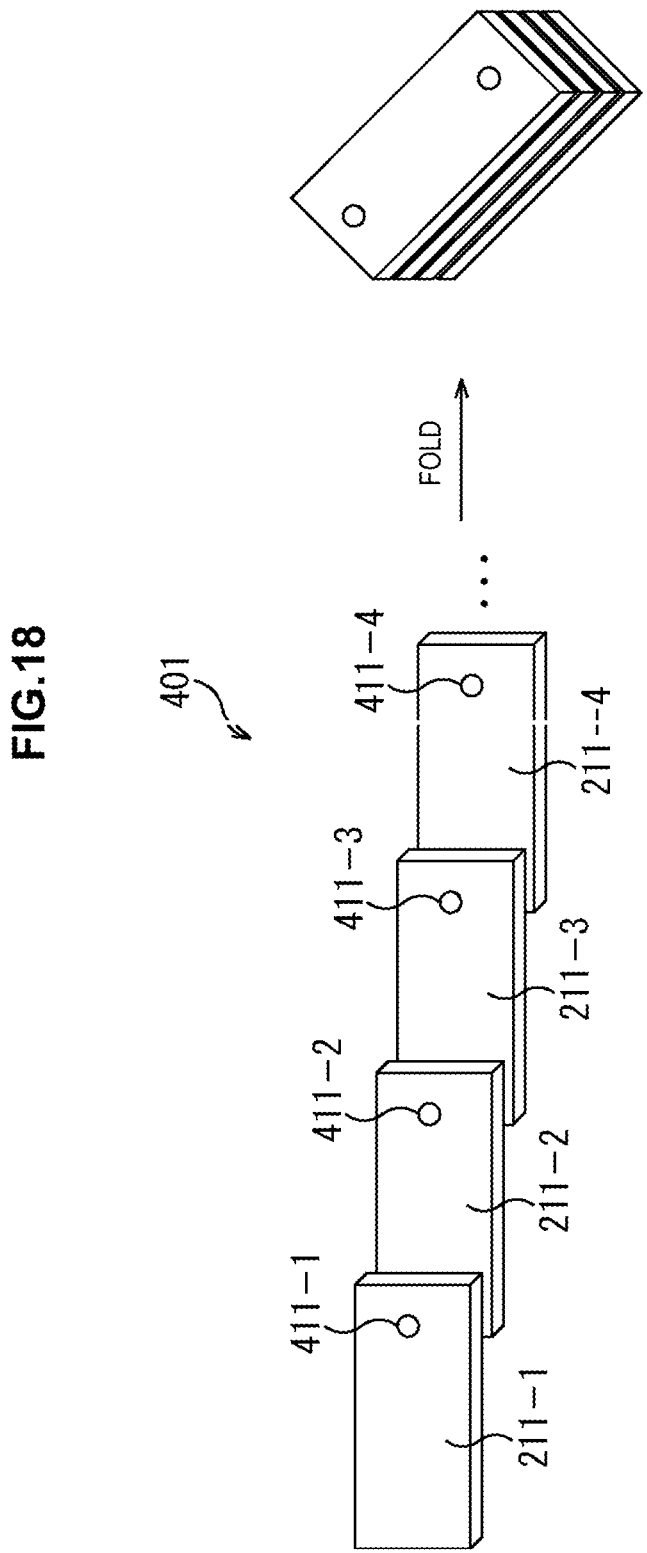

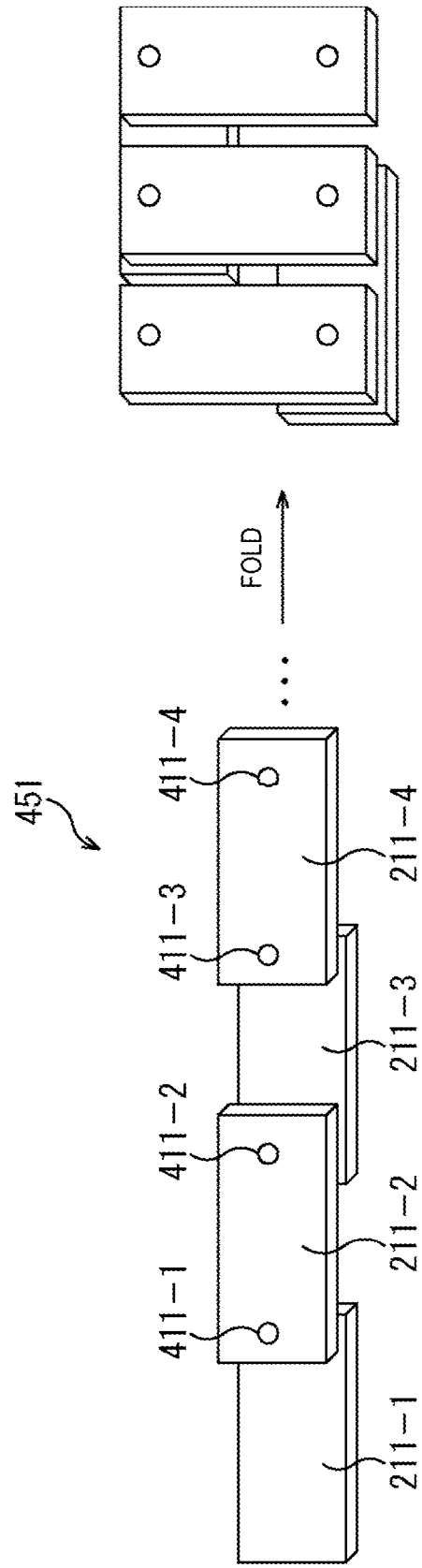

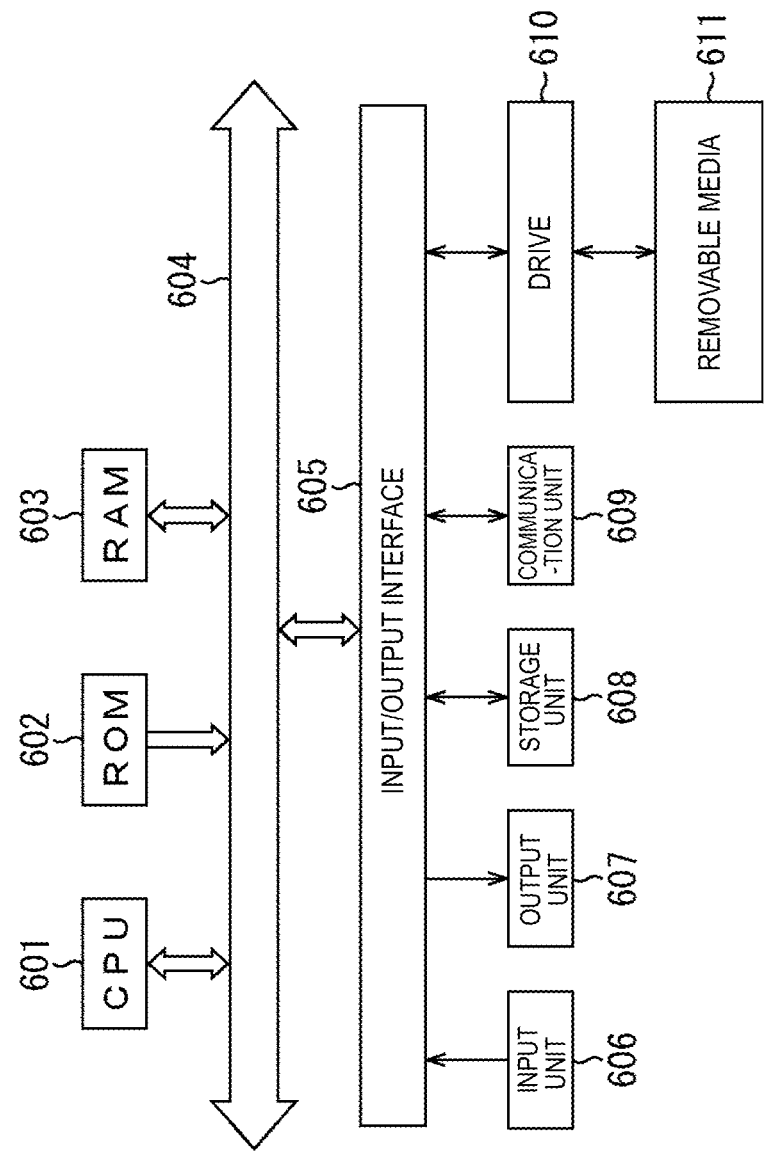

MEASUREMENT APPARATUS, MEASUREMENT METHOD, PROGRAM, AND RECORDING MEDIUM

BACKGROUND

The present technology relates to a measurement apparatus, a measurement method, a program, and a recording medium, and particularly, to a measurement apparatus, a measurement method, a program, and a recording medium, which are suitable for use in measuring the peripheral shape of an object to be measured.

In the related art, there have been disclosed a measurement apparatus in which a tape or a belt is wound around the abdomen, the wound tape or belt is strained and tightened with a predetermined strength, and an abdominal girth length is automatically measured (for example, refer to JP 2009-75013A and JP 2008-259746A).

SUMMARY

However, in the related apparatus for automatically measuring the abdominal girth length, it is not possible to measure the shape of an abdominal girth.

Meanwhile, by means of a medical examination apparatus using technology such as magnetic resonance imaging (MRI) or computed tomography (CT), the section of the abdomen is visualized, so that it is also possible to measure the shape of the abdominal girth as well as the abdominal girth. However, since such a medical examination apparatus has a large size and is expensive and it is necessary to lie on a bed for examination, it is not possible for ordinary people to easily use the medical examination apparatus.

In light of the foregoing, it is desirable to easily measure the peripheral shape of an object to be measured such as an abdominal girth.

According to an embodiment of the present technology, there is provided a measurement apparatus which includes a band-shaped body in which a plurality of members are connected to one another through connection axes parallel to one another, and inter-member angles can be adjusted and detected, the inter-member angle indicating an angle between the members adjacent to each other through the connection axis, and a measurement section that measures a peripheral shape based on the detected inter-member angle, the peripheral shape indicating a shape of at least a part of a periphery of an object to be measured on which the band-shaped body is mounted.

When one end of the band-shaped body is brought into contact with a part of the band-shaped body, the measurement section may measure the peripheral shape of the object to be measured based on the inter-member angle detected in a measurement range that indicates a range from the one end of the band-shaped body to a position at which the one end of the band-shaped body is brought into contact with the part of the band-shaped body.

The measurement section may measure a peripheral length based on a length of each of the members in a longitudinal direction of the band-shaped body in the measurement range, the peripheral length indicating a length of the at least a part of the periphery of the object to be measured.

Each of the members may be provided with an operation unit for setting a measurement range indicating a range of the band-shaped body used in measurement. The measurement section may measure the peripheral shape of the object to be measured based on the inter-member angle detected in the measurement range set by operating the operation unit.

The measurement section may measure a peripheral length based on a length of each of the members in a longitudinal direction of the band-shaped body in the measurement range, the peripheral length indicating a length of the at least a part of the periphery of the object to be measured.

Each of the members may have flexibility and may be provided with a sensor for detecting a degree of bending of the member. The measurement section may measure the peripheral shape of the object to be measured based on the detected degree of bending of each of the members.

A sensor may be provided on a surface, of at least one of the members, which is brought into contact with the object to be measured, to detect pressure between the member and the object to be measured at a time of mounting the band-shaped body.

A sensor may be provided on at least one of the members to detect a position in a height direction of the member.

The measurement section may measure the peripheral shape of the object to be measured based on a length of each of the members in a longitudinal direction of the band-shaped body, in addition to the inter-member angle.

The measurement section may generate a measurement image indicating the peripheral shape of the object to be measured.

A display control section that controls display of the measurement image may further be included.

According to an embodiment of the present technology, there is provided a measurement method in a measurement apparatus including a band-shaped body in which a plurality of members are connected to one another through connection axes parallel to one another, and inter-member angles can be detected, the inter-member angle indicating an angle between the members adjacent to each other through the connection axis, the measurement method including detecting each inter-member angle at a time of mounting the band-shaped body on at least a part of a periphery of an object to be measured, and measuring a peripheral shape based on the detected inter-member angle, the peripheral shape indicating a shape of the at least a part of the periphery of the object to be measured.

According to an embodiment of the present technology, there is provided a program for causing a computer to perform a process of measuring a peripheral shape indicating a shape of at least a part of a periphery of an object to be measured based on inter-member angles detected when a band-shaped body is mounted on the at least a part of the periphery of the object to be measured, the band-shaped body including a plurality of members connected to one another through connection axes parallel to one another, and the inter-member angle indicating an angle between the members adjacent to each other through the connection axis and being adjustable.

According to an embodiment of the present technology, in a band-shaped body in which a plurality of members are connected to one another through connection axes parallel to one another, an inter-panel angle indicating an angle between the members adjacent to each other through the connection axis is adjusted. Each inter-member angle when the band-shaped body is mounted on at least a part of a periphery of an object to be measured is detected, and a peripheral shape is measured based on the detected inter-member angle, the peripheral shape indicating a shape of the at least a part of the periphery of the object to be measured.

According to an embodiment of the present technology, it is possible to easily measure the peripheral shape of an object to be measured.

BRIEF DESCRIPTION OF THE DRAWINGS

FIG. 13 is a diagram illustrating a display example of a measurement result when the abdominal girth of a person is measured;

FIG. 17 is a diagram illustrating an example in which a coupling section of a panel has allowance;

FIG. 18 is a diagram for explaining a modification example of an articulation mechanism of a band;

FIG. 19 is a diagram for explaining a modification example of an articulation mechanism of a band; and FIG. 20 is a block diagram illustrating a configuration example of a computer.

DETAILED DESCRIPTION OF THE EMBODIMENT(S)

Figure 1:
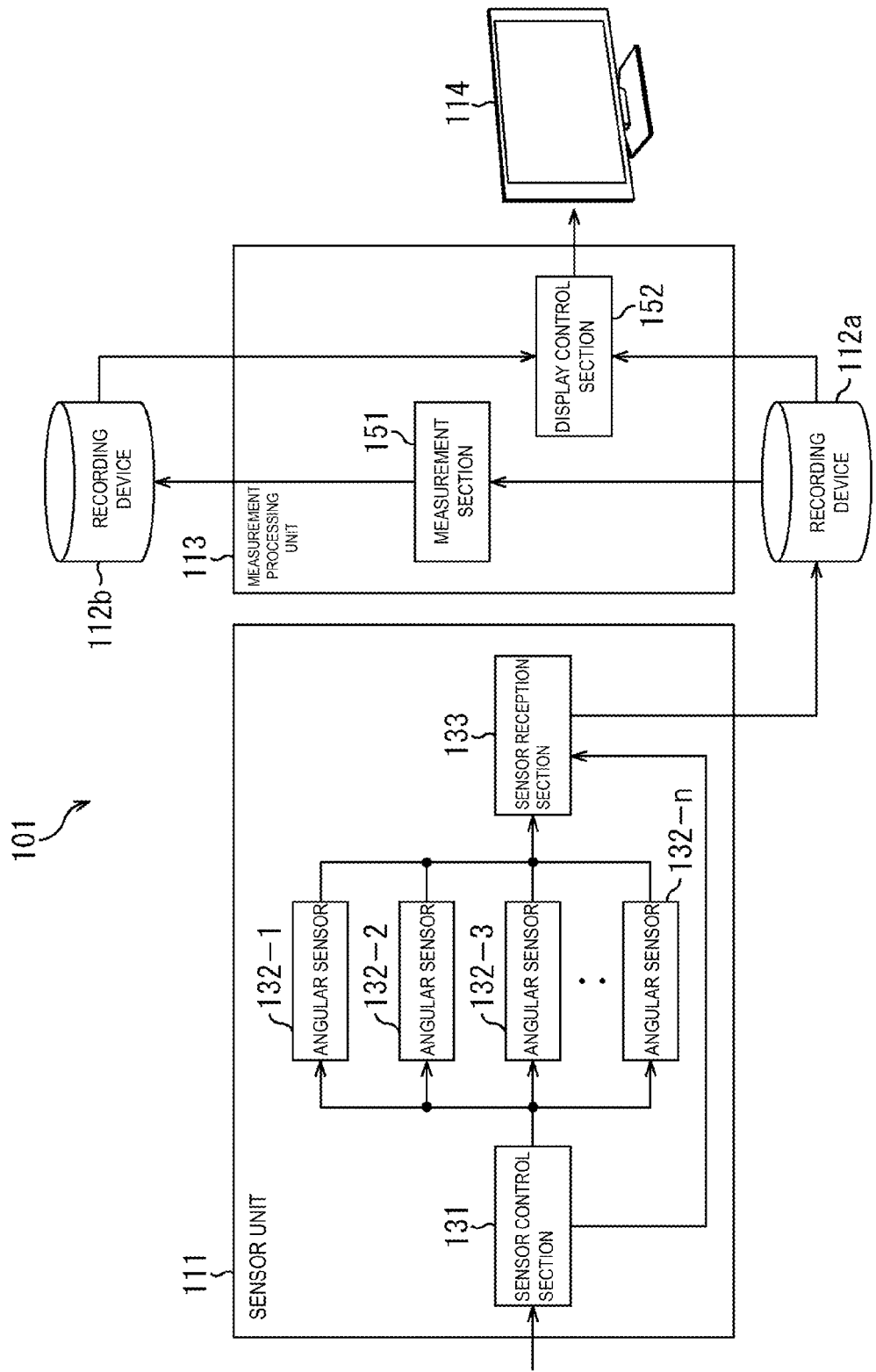
FIG. 1 is a block diagram illustrating an embodiment of a measurement apparatus employing the present technology.

Hereinafter, preferred embodiments of the present technology will be described in detail with reference to the appended drawings. Note that, in this specification and the appended drawings, structural elements that have substantially the same function and structure are denoted with the same reference numerals, and repeated explanation of these structural elements is omitted.

Hereinafter, an example (hereinafter referred to as an embodiment) for implementing the present technology will be described. In addition, the description will be given in the following order.

1. Embodiment
2. Modification

<1. Embodiment>

[Configuration of Measurement Apparatus 101]

Figure 2:
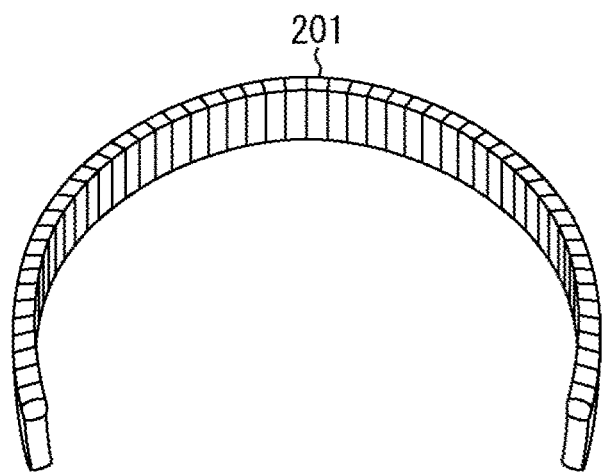
FIG. 2 is a diagram illustrating a configuration example of the external appearance of a band of a measurement apparatus.
Figure 3:
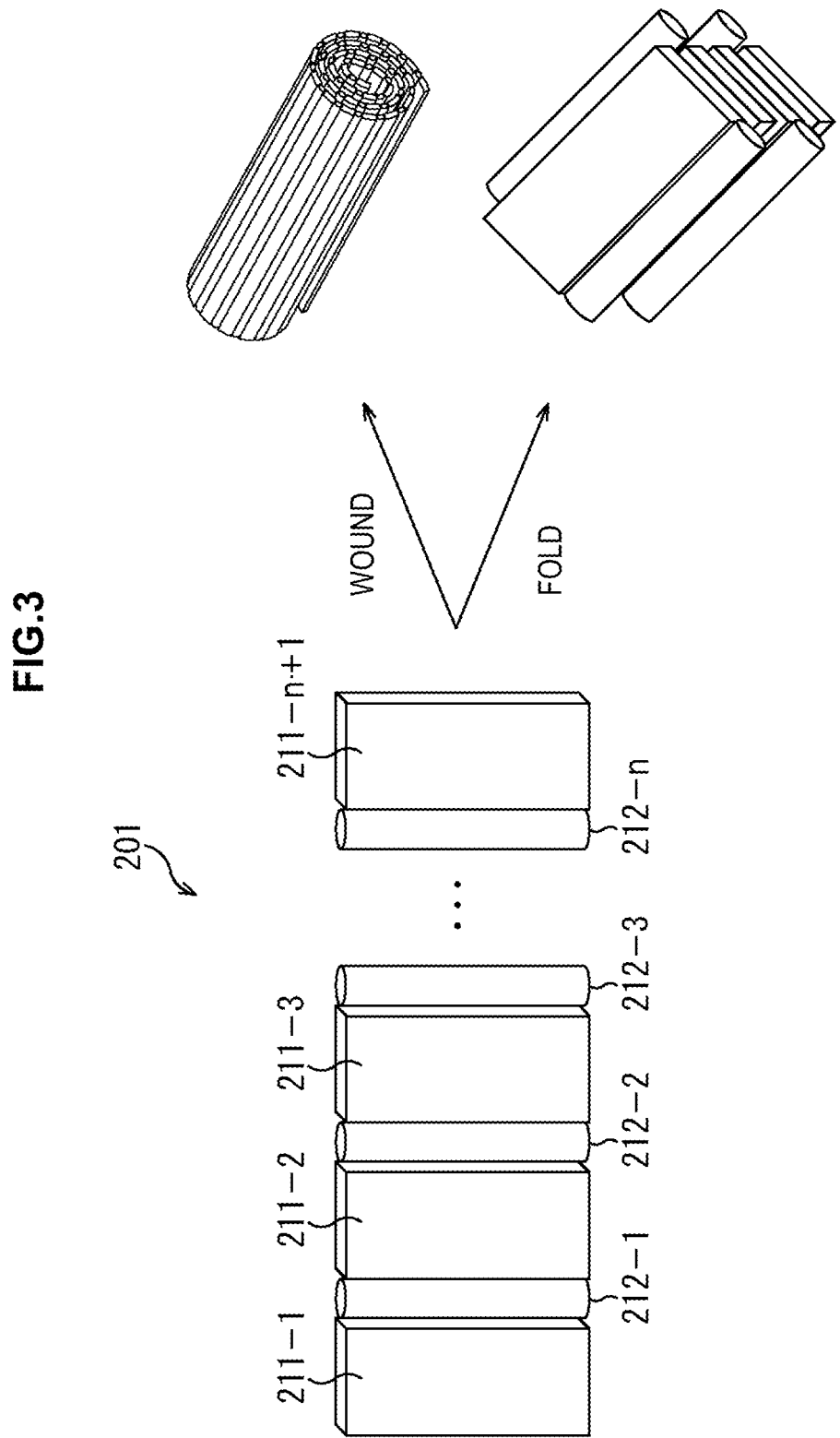
FIG. 3 is a diagram illustrating an example of an articulation mechanism of a band of a measurement apparatus.

FIG. 1 is a block diagram illustrating a configuration example of a measurement apparatus 101 employing the present technology, except for a band 201. FIG. 2 is a diagram illustrating a configuration example of the external appearance of the band 201, and FIG. 3 is a diagram illustrating an example of an articulation mechanism of the band 201.

The band 201 is a mounting member which is mounted on a periphery or a part of an object to be measured in order to measure the length (hereinafter referred to as a peripheral length) and the shape (hereinafter referred to as a peripheral shape) of at least a part of the object to be measured. The band 201 forms a band-shaped body in which panels 211-1 to 211-(n+1) are connected to one another through joints 212-1 to 212-n which are connection axes parallel to one another, wherein the panels 211-1 to 211-(n+1) are rectangular plate members with the same size.

In addition, hereinafter, when the panels 211-1 to 211-(n+1) do not have to be individually distinguished from one another, the panels 211-1 to 211-(n+1) will be simply referred to as panels 211, and when the joints 212-1 to 212-n do not have to be individually distinguished from one another, the joints 212-1 to 212-n will be simply referred to as joints 212.

Furthermore, hereinafter, the length of the panel 211 in the longitudinal direction of the band 201 will be referred to as the width of the panel 211. An interval between adjacent joints 212 is determined by the width of the panel 211.

Two adjacent panels 211 are foldable or unfoldable about the joint 212 therebetween, and an angle (hereinafter referred to as an inter-panel angle) between the two adjacent panels 211 is adjustable. Consequently, the inter-panel angles are individually adjusted, so that the band 201 can be wound around an object to be measured. Then, the measurement apparatus 101 measures the peripheral length and the peripheral shape of the object to be measured on which the band 201 is mounted.

In addition, an object to be measured by the measurement apparatus 101 is not particularly limited. For example, the object to be measured includes the abdomen, the breast, the head, the neck, and the limbs of the human body or an animal, industrial goods, and the like. Furthermore, as will be described later, the measurement apparatus 101 can not only measure the length and shape of the whole of the periphery of the object to be measured, but can also measure the length and shape of a part of the periphery.

Furthermore, the band 201 may be rolled and accommodated as illustrated in the right upper portion of FIG. 3, or the panels 211 may be alternately folded and accommodated as illustrated in the right lower portion of FIG. 3.

Moreover, the material of the panel 211 is not particularly limited. For example, it is preferable to use a material that is difficult to deform, such as a plastic or a metal.

Furthermore, in addition to the band 201, the measurement apparatus 101 includes a sensor unit 111, recording devices 112a and 112b, a measurement processing unit 113, and a display 114 as illustrated in FIG. 1.

The sensor unit 111 includes a sensor control section 131, angular sensors 132-1 to 132-n, and a sensor reception section 133.

In addition, hereinafter, when the angular sensors 132-1 to 132-n do not have to be individually distinguished from one another, the angular sensors 132-1 to 132-n will be simply referred to as angular sensors 132.

The sensor control section 131 controls measurement timing and the like of each angular sensor 132. Furthermore, the sensor control section 131 receives the input of a measurement trigger indicating the measurement timing, and supplies the measurement trigger to the sensor reception section 133 according to necessity.

The angular sensors 132-1 to 132-n are installed in the joints 212-1 to 212-n, respectively, and measure an angle (an inter-panel angle) between two panels 211 connected to each other through the installed joint 212.

Figure 4:
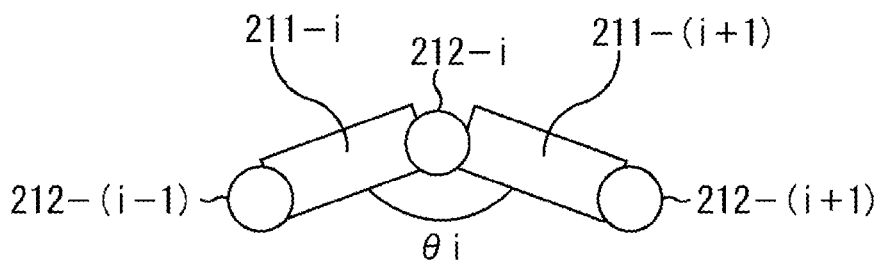
FIG. 4 is a diagram for explaining the position at which an angular sensor is installed in a band.

For example, the joint 212-i of FIG. 4 is provided with the angular sensor 132-i (not illustrated), and an angle θi between the panels 211-i and 211-(i+1) connected to each other through the joint 212-i is measured by the angular sensor 132-i.

Then, each angular sensor 132 supplies sensor data indicating the measured inter-panel angle to the sensor reception section 133.

In addition, the angular sensor 132 is not limited to a specific type as long as it is possible to detect an angle between adjacent panels 211. For example, the angular sensor 132 is configured using a rotary potentiometer.

The sensor reception section 133 preserves the sensor data, which is received from each angular sensor 132, in the recording device 112a.

The measurement processing unit 113 includes a measurement section 151 and a display control section 152.

The measurement section 151 measures the peripheral length and the peripheral shape of an object to be measured using the sensor data recorded on the recording device 112a. Then, the measurement section 151 generates measurement data including an image (hereinafter referred to as a measurement image) indicating the peripheral length of the object to be measured and the peripheral shape of the object to be measured, and preserves the measurement data in the recording device 112b.

The display control section 152 allows the display 114 to display a measurement result of the peripheral length and the peripheral shape of the object to be measured based on the sensor data preserved in the recording device 112a and the measurement data preserved in the recording device 112b.

As the display 114, a dedicated display may be used, or a display of another apparatus such as a television receiver, a personal computer, or a portable cellular phone may also be used.

[Measurement Process]

Figure 5:
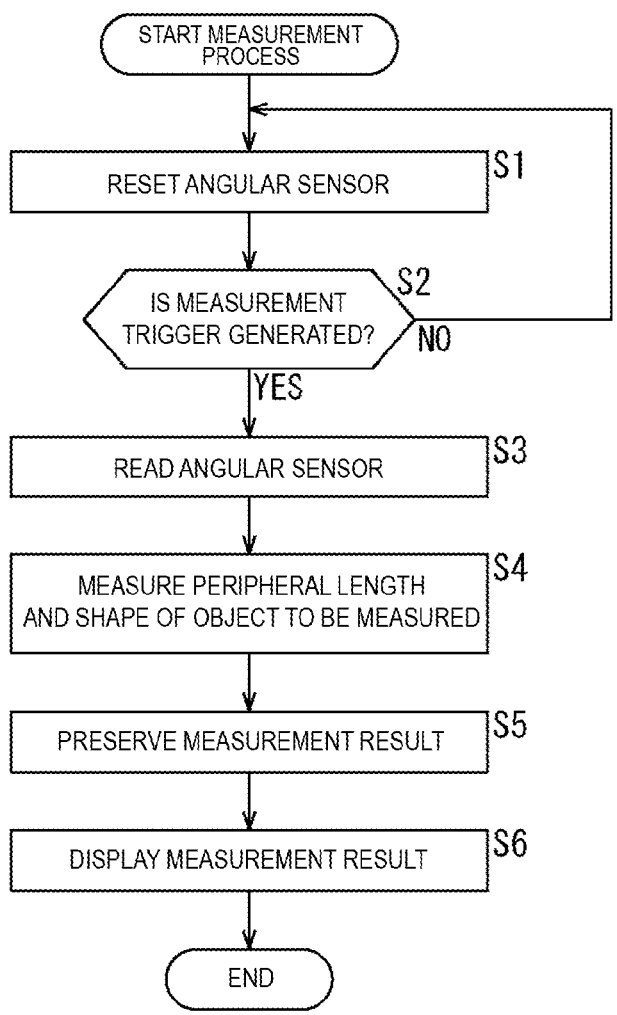
FIG. 5 is a flowchart for explaining a measurement process performed by a measurement apparatus.

Next, with reference to FIG. 5, a measurement process performed by the measurement apparatus 101 will be described. In addition, this process, for example, starts when a user inputs a command for measurement start of an object to be measured through an input unit (not illustrated).

In step S1, the sensor control section 131 resets the angular sensors 132.

In step S2, the sensor control section 131 determines whether a measurement trigger has been generated.

Hereinafter, with reference to FIG. 6 to FIG. 9, a detailed example of a generation method of the measurement trigger will be described.

Figure 6:
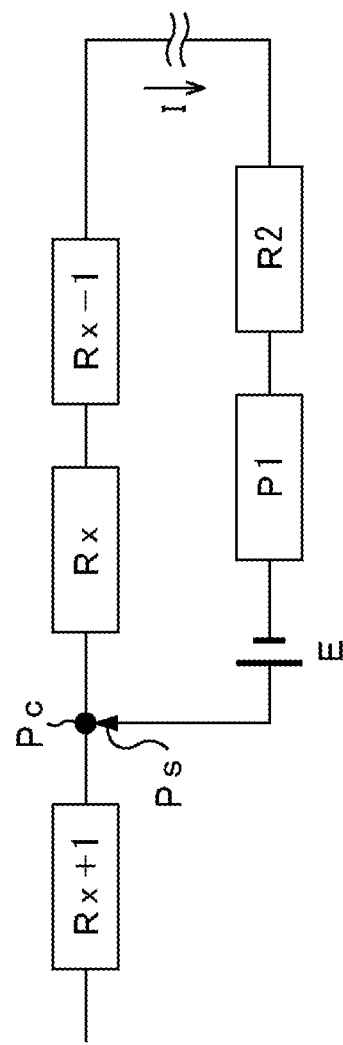
FIG. 6 is a diagram for explaining a generation method of a measurement trigger.

For example, the panels 211 are made of a member with high conductivity, and resistors R1 to Rn+1 having the same resistance value are embedded in the panels 211, respectively. Furthermore, as illustrated in FIG. 6, the resistors R1 to Rn+1 (the panels 211-1 to 211-(n−1)) are electrically connected in series to one another, and a battery E with a predetermined voltage is connected between a starting point Ps and the resistor R1. The starting point Ps, for example, is set in the front end (the left end of the panel 211-1 of FIG. 3) of the band 201.

Then, when a user allows the band 201 to be wound around an object to be measured once, and allows the front end (the starting point Ps) of the band 201 to be brought into contact with the panel 211 crossing the front end of the band 201, an electric current I flows through a closed circuit formed between the starting point Ps and a contact point Pc. When a signal indicating a measurement value of the electric current I is input to the sensor control section 131 and the electric current I is equal to or more than a predetermined threshold value, the sensor control section 131 determines that the measurement trigger has been generated.

Figure 7:
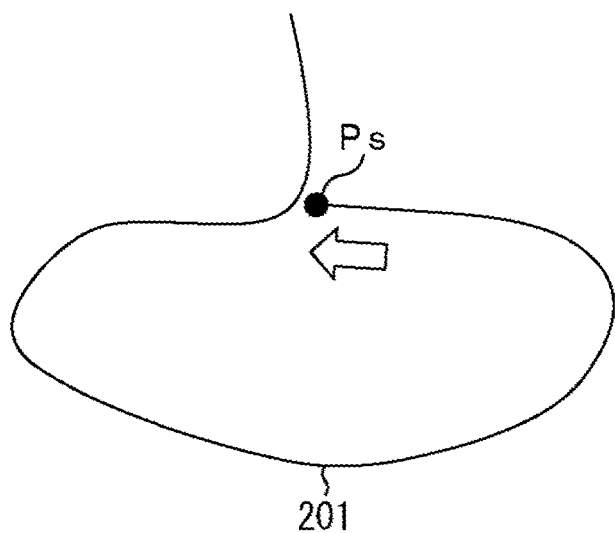
FIG. 7 is a diagram for explaining a generation method of a measurement trigger.
Figure 8:
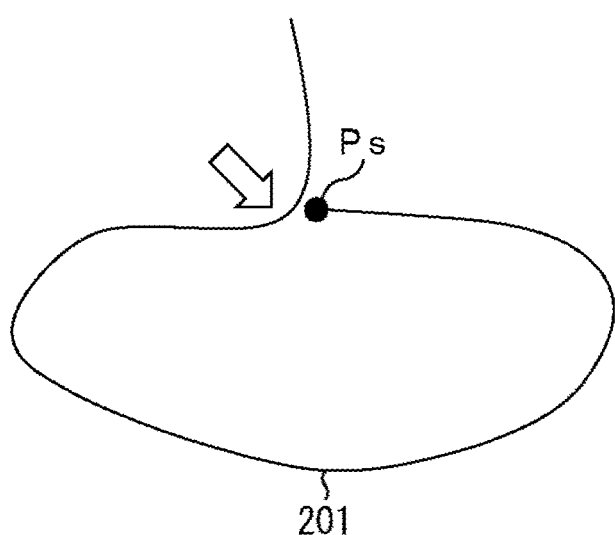
FIG. 8 is a diagram for explaining a generation method of a measurement trigger.

In addition, for example, as illustrated in FIG. 7, the starting point Ps may be moved to be brought into contact with the panel 211. Alternatively, as illustrated in FIG. 8, the position of the starting point Ps may be fixed and the panel 211 may be moved to be brought into contact with the starting point Ps. In addition, in the latter case, for example, the starting point Ps is considered to be realized by a structure similar to a belt buckle.

In addition, it is possible for the sensor control section 131 to calculate the range (hereinafter referred to as a measurement range) of the panel 211, which is a range from the starting point Ps to the contact point Pc and is used in measurement, based on the value of the electric current I.

In detail, since the resistance values R of the resistors R1 to Rn and the voltage E of the battery E are generally known, the number x of resistors between the starting point Ps and the contact point Pc can be calculated as in Equation 1 below.

$$x = E/(R \times I) \quad (1)$$

Then, the panels 211-1 to 211-x can be calculated as the measurement range.

In addition, hereinafter, the panel 211-1 at the starting point in the measurement range will be referred to as a starting point panel, and the panel 211-x at an ending point will be referred to as an ending point panel.

Figure 9:
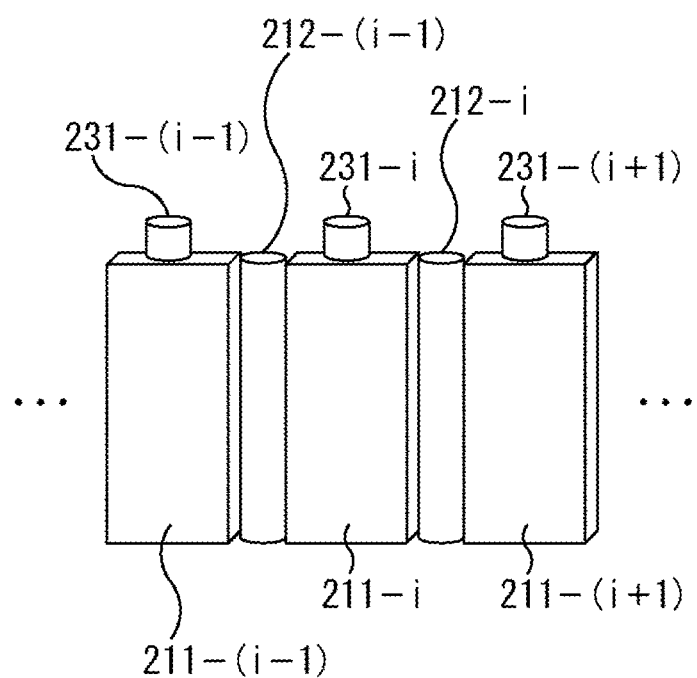
FIG. 9 is a diagram for explaining a generation method of a measurement trigger.

Furthermore, for example, as illustrated in FIG. 9, buttons 231-1 to 231-(n+1) for generating the measurement trigger may be provided in the panels 211-1 to 211-(n+1), respectively.

Then, when the button 231-x of the panel 211-x (an ending panel) is pressed, a signal indicating that the ending point panel is the panel 211-x is input to the sensor control section 131 as the measurement trigger. Consequently, it is possible for the sensor control section 131 to detect the generation of the measurement trigger and understand the measurement range.

In this case, even when the band 201 is not wound around the object to be measured once, it is possible to generate the measurement trigger and set the measurement range. Consequently, it is possible to measure the length and the shape of a part of the periphery of the object to be measured.

Furthermore, as well as the ending point panel, the starting point panel may be designated using the buttons 231-1 to 231-(n+1). In this case, for example, when two different buttons of the buttons 231-1 to 231-(n+1) are pressed, a gap between the two panels 211 corresponding to the two buttons is set as the measurement range.

Moreover, a method of designating the starting point panel or the ending point panel is not limited to the above-mentioned example. For example, an arbitrary method may also be employed. For example, instead of the installation of the buttons 231-1 to 231-(n+1), each panel 211 may be configured using a touch panel, and the starting point panel or the ending point panel may be designated by touching the touch panel.

Returning to FIG. 5, in step S2, when it is determined that the measurement trigger has not been generated, the procedure returns to step S1. Then, in step S2, until it is determined that the measurement trigger has been generated, the processes of steps S1 and S2 are repeated.

Meanwhile, in step S2, when it is determined that the measurement trigger has been generated, the procedure returns to step S3.

In step S3, the sensor unit 111 reads the angular sensor 132. In detail, the angular sensor 132 detects each inter-panel angle and supplies sensor data indicating a detection result to the sensor reception section 133 under the control of the sensor control section 131. Furthermore, the sensor control section 131 supplies data indicating the position of the ending point panel to the sensor reception section 133. The sensor reception section 133 preserves the sensor data from the angular sensor 132 in the measurement range (from the starting point panel to the ending point panel) in the recording device 112a.

In step S4, the measurement section 151 measures the length and the shape of the periphery of the object to be measured. In detail, the measurement section 151 reads the sensor data from the recording device 112a. Then, the measurement section 151 calculates a diagram (hereinafter referred to as a connection diagram), which is obtained by connecting the panels 211 in the measurement range to one another, based on the inter-panel angles indicated by the sensor data.

Figure 10:
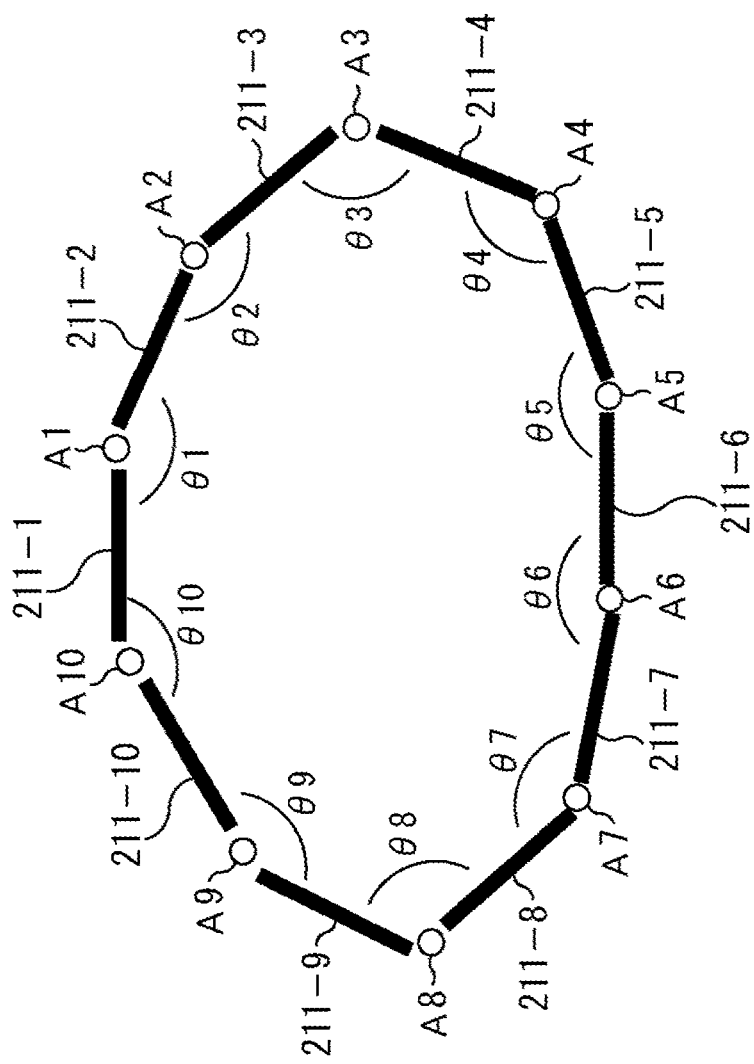
FIG. 10 is a diagram illustrating an example of a connection diagram.

For example, when the panels 211-1 to 211-10 are included in the measurement range, a diagram as illustrated in FIG. 10 is obtained. In addition, values detected by the angular sensors 132-1 to 132-9 in the measurement range are used as angles θ1 to θ9, and an angle θ10 is obtained by calculation when the sum of inner angles of a polygon with n sides is (n−2)×180°.

Then, based on the detected angles θ1 to θ10, the connection diagram as illustrated in FIG. 10 is obtained. In addition, apexes A1 to A9 indicate the positions of the joints 212-1 to 212-9 and an apex A10 indicates the position of the starting point Ps.

At this time, since the inner angles of the connection diagram are generally known, it is possible to obtain a diagram similar to the diagram formed by the panels 211 in the measurement range as the connection diagram without using the widths of the panels 211. In the same manner, even when the shape of a part of the periphery of the object to be measured is measured, if the widths of the panels 211 are constant, it is possible to obtain a diagram similar to the diagram formed by the panels 211 in the measurement range as the connection diagram without using the widths of the panels 211. Furthermore, even when the exact widths of the panels are not known, if the ratio of the widths of the panels is generally known, it is possible to obtain a diagram, which is similar to the diagram formed by the panels 211 in the measurement range, as the connection diagram.

Moreover, by means of the widths of the panels 211, it is possible to obtain a connection diagram in which the dimension of each side has been accurately reflected.

Then, the measurement section 151 connects the apexes of the calculated connection diagram to one another through a smooth curve using a technique such as spline interpolation, thereby generating a measurement image indicating the peripheral shape of the object to be measured.

Figure 11:
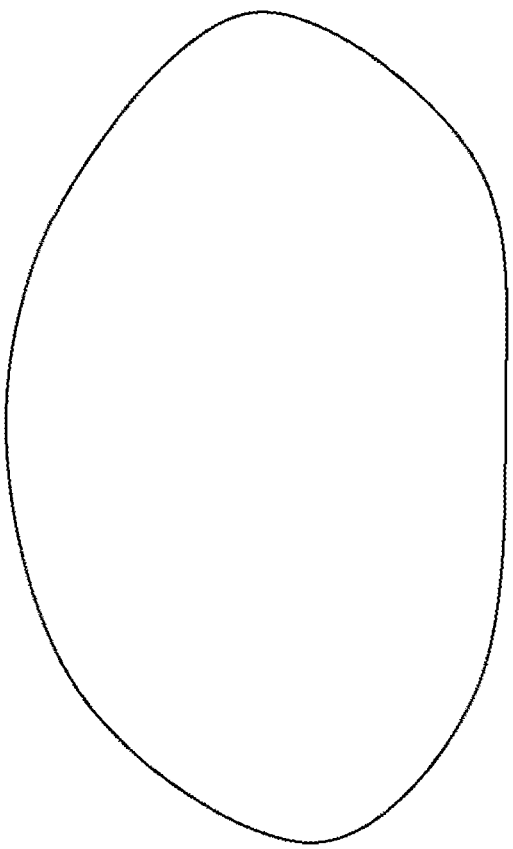
FIG. 11 is a diagram illustrating an example of a measurement image.

For example, the apexes A1 to A10 of the connection diagram in FIG. 10 are connected to one another through a smooth curve by using the spline interpolation, resulting in the generation of a measurement image having a smooth shape as illustrated in FIG. 11.

In addition, when it is not necessary to smoothly display the measurement image, the connection diagram may also be used as the measurement image.

Furthermore, the measurement section 151 calculates the peripheral length of the object to be measured. For example, the measurement section 151 calculates the peripheral length based on the widths of the panels 211 in the measurement range. Here, since the widths of the panels 211 are common and generally known, if the number of panels 211 in the measurement range can be known, it is possible to calculate the peripheral length. Furthermore, at this time, the peripheral length is calculated in consideration of the length or allowance of the joint 212.

Alternatively, for example, the measurement section 151 calculates the peripheral length based on the length of a curve of the generated measurement image.

In step S5, the measurement section 151 preserves a measurement result. That is, the measurement section 151 preserves measurement data including the peripheral length and the measurement image of the object to be measured in the recording device 112b.

In step S6, the measurement apparatus 101 displays the measurement result. In detail, the display control section 152 reads the measurement data preserved in the recording device 112b. Furthermore, the display control section 152 reads the sensor data preserved in the recording device 112a. Then, the display control section 152 allows the display 114 to display the measurement image (for example, the measurement image of FIG. 11) and the peripheral length of the object to be measured. Furthermore, the display control section 152 allows the display 114 to display the measurement value of the inter-panel angle based on the sensor data according to the necessity.

Figure 12:
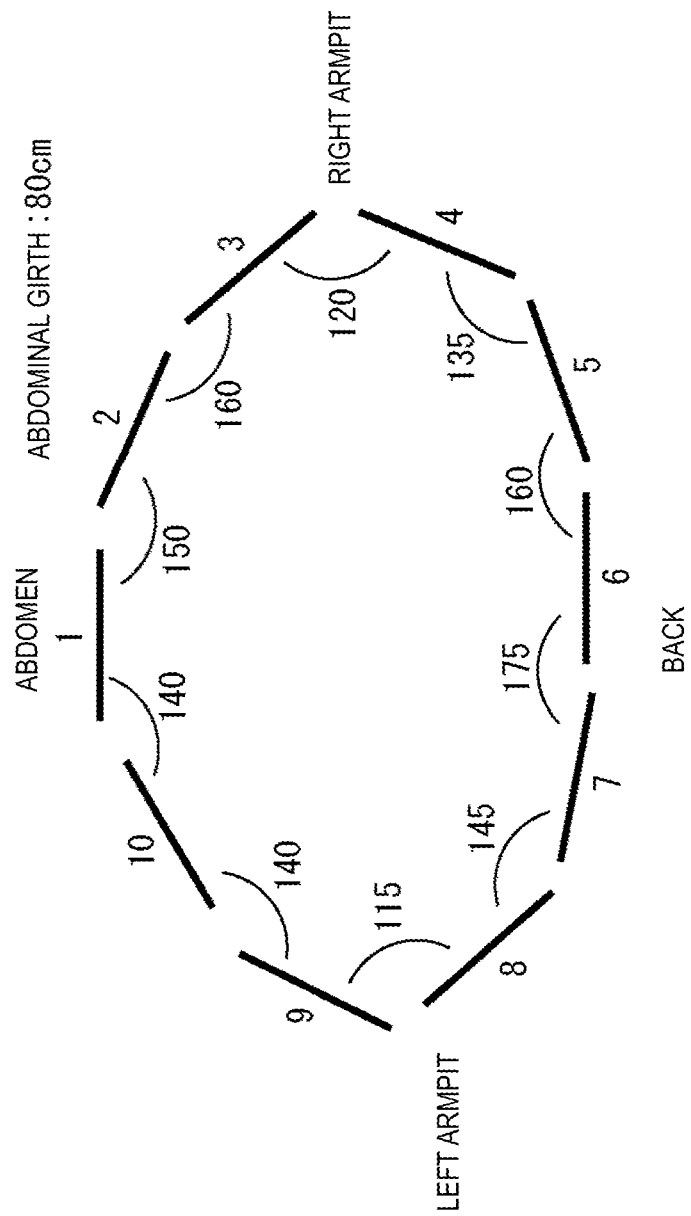
FIG. 12 is a diagram illustrating a display example of a measurement result when the abdominal girth of a person is measured.

FIG. 12 is a diagram illustrating a display example of a measurement result when the abdominal girth of a person is measured. FIG. 12 illustrates an example in which a connection diagram is used as a measurement image.

This example does not only shows the position and the number of each panel, and the inter-panel angle in the measurement image, but also illustrates the direction (the abdomen, the back, the left armpit, the right armpit) of the measurement image. Furthermore, this example shows a measurement value of an abdominal girth length.

Furthermore, the measurement image may be displayed as is. For example, the measurement image may be displayed using numerical values or illustrations, or an effect such as emphasis or deformation may be applied. For example, as illustrated in FIG. 13, the shape of an abdominal girth may be divided into a plurality of patterns, and a diagram indicating the characteristics of a corresponding pattern may be displayed together with a simple description.

Thereafter, the measurement process is completed.

In this way, the band 201 is mounted on the periphery of the object to be measured, the measurement trigger is allowed to be simply generated, and the length and the shape of the periphery or a part of the object to be measured are simply measured, so that it is possible to visualize a measurement result. Particularly, it is not necessary to provide a scale on the band 201 and read the scale.

Figure 14:
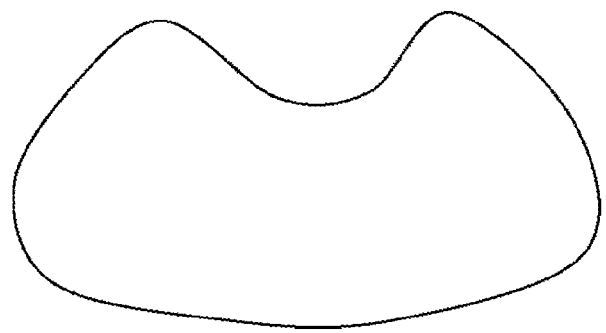
FIG. 14 is a diagram illustrating an example of the shape of a measurable object.

Furthermore, if it is possible to mount the band 201 on the periphery of the object to be measured, for example, it is also possible to measure an object to be measured having a concave-convex section (for example, a woman's breast) as illustrated in FIG. 14, as well as an object to be measured having a convex section (for example, the abdomen of a person).

Moreover, if it is possible to mount the band 201 on the periphery of an object to be measured, the posture of the object to be measured is not particularly limited. For example, when the abdominal girth or the chest girth of a person is measured, the body position of a person to be measured may include an erect position, a seated position, and a recumbent position.

Furthermore, when each part of the human body is measured, the band 201 is simply mounted, so that a person to be measured can measure each part of the human body by himself or herself and a person other than the person to be measured can measure each part of the human body.

Moreover, it is possible to mount the band 201 on an object to be measured through a remote operation and to measure the object to be measured using a robot arm.

In addition, as the width of the panel 211 is narrow and an interval between adjacent joints 212 is narrow, the reproducibility of the shape of an object to be measured and the degree of accuracy of measurement are considered to be improved. Meanwhile, if the width of the panel 211 is narrow, the number of parts is increased, resulting in an increase in risk of malfunction occurring. In this regard, it is preferable to set the width of the panel 211 such that the width of the panel 211 is not unnecessarily narrow, in consideration of the target degree of accuracy of measurement.

Furthermore, the present technology, for example, is particularly useful when detecting a daily change or transition in a peripheral length or shape of an object to be measured, such as an abdominal girth, without requiring the accuracy of several millimeters.

<2. Modification>

Hereinafter, modifications of the embodiment of the present technology will be described.

[Modification 1]

So far, the example in which the measurement section 151 outputs the measurement image as the measurement result of the peripheral shape of an object to be measured has been described. However, data, other than the measurement image, may be output as the measurement result.

For example, data (for example, the length and the angle of each side) indicating the connection diagram described with reference to FIG. 10 may be output as the measurement result. Furthermore, for example, both the connection diagram and the measurement image may be output as the measurement result.

[Modification 2]

Figure 15:
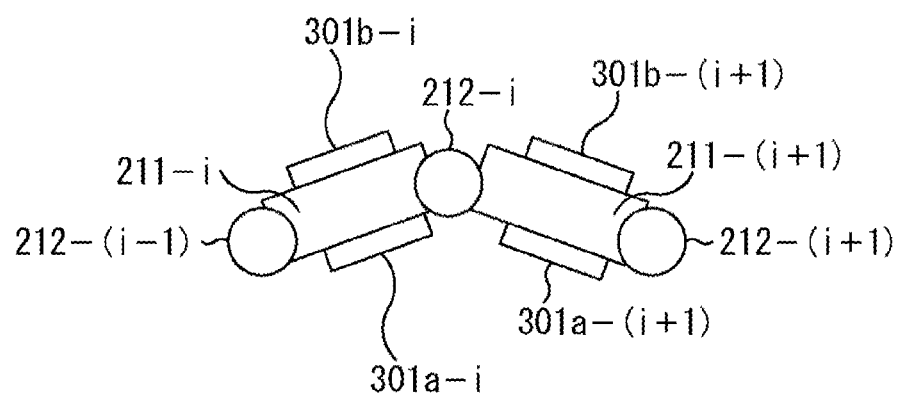
FIG. 15 is a diagram illustrating an example in which a pressure sensor is installed in a panel of a band.

Furthermore, for example, as illustrated in FIG. 15, the panels 211-1 to 211-(n+1) may be provided on both sides (surfaces making contact with an object to be measured) thereof with pressure sensors 301a-1 to 301a-(n+1) and pressure sensors 301b-1 to 301b-(n+1), respectively. Then, when the band 201 has been mounted on the object to be measured, pressure between each panel 211 and the object to be measured is measured by the pressure sensors 301a-1 to 301b-(n+1), so that the degree of tightening of the band 201 may be measured.

Hereinafter, when the pressure sensors 301a-1 to 301b-(n+1) do not have to be individually distinguished from one another, the pressure sensors 301a-1 to 301b-(n+1) will be simply referred to as pressure sensors 301.

Consequently, for example, in the case of measuring an abdominal girth, when the band 201 is excessively tightened as a result obtained by checking the degree of tightening of the band 201, it is possible to attract the attention of a measurer through light, sound and the like.

Furthermore, for example, if the band 201 is firmly tightened, the shape of the abdominal girth is deformed by the pressure of the band 201 and the length or shape of the abdominal girth in the deformed state is measured. However, it is preferable to inform a user of the length or shape of the abdominal girth before deformation. In this regard, the length or shape of the abdominal girth in the original state before being deformed may be calculated using a detection value of the pressure sensors 301. This is effective when measuring the periphery of an object (for example, an abdominal girth) to be measured which has flexibility and is deformed by firmly tightening the band 201.

[Modification 3]

Furthermore, instead of the pressure sensor 301 of FIG. 15, alternatively, a barometric pressure sensor may also be provided together with the pressure sensor 301. For example, in the case of measuring an abdominal girth, it may be possible to detect the position in the height direction of each panel 211 using the barometric pressure sensor, and to check whether the band 201 has been horizontally mounted based on a result of the detection. As a consequence, for example, when the band 201 has been obliquely mounted, it is possible to attract the attention of a measurer through light, sound and the like.

In addition, when a contact surface between the band 201 and an object to be measure has been determined, each panel 211 may also be provided on only one side thereof with the pressure sensor 301 or the barometric pressure sensor. Furthermore, it is not necessary to provide the pressure sensor 301 or the barometric pressure sensor to all panels 211. For example, the panels 211 may be appropriately selected.

[Modification 4]

Figure 16:
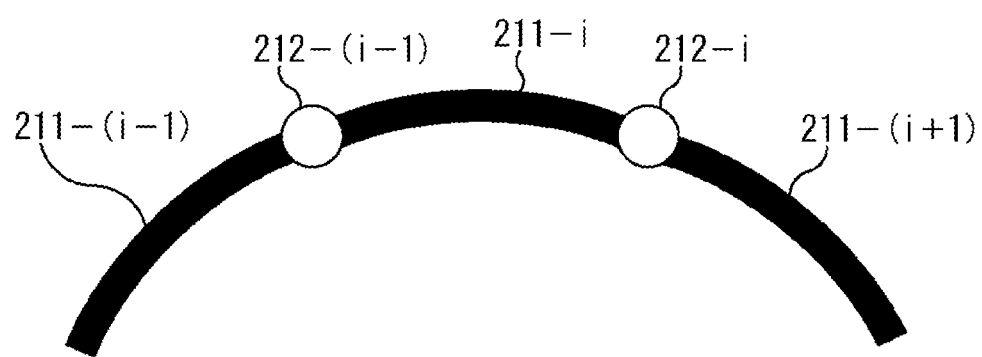
FIG. 16 is a diagram illustrating an example in which a panel of a band has flexibility.

Moreover, as illustrated in FIG. 16, the panel 211 may be made of a flexible material having flexibility and a sensor (for example, an optical goniometer, a bending sensor and the like) may be installed in each panel 211 to detect the degree of bending thereof. Then, the peripheral shape of an object to be measured may be measured using the detection value of the degree of bending of each panel 211.

Consequently, it is possible to reduce the number of panels or the number of joints without reducing the measurement accuracy of the peripheral shape of the object to be measured.

[Modification 5]

Furthermore, for example, it may be possible to detect that excessive force has been applied to the angular sensor 132. When the excessive force has been applied thereto, it may be possible to attract the attention of a measurer through light, sound and the like.

[Modification 6]

Moreover, the arrangement of the elements of the measurement apparatus 101 is not limited to the example of FIG. 1. That is, the arrangement may be changed. For example, the sensor unit 111 and the measurement processing unit 113 may be integrally formed with each other. Furthermore, for example, the recording device 112a may be provided to be included in the sensor unit 111 or the measurement processing unit 113, or the recording device 112b may be provided to be included in the measurement processing unit 113. Moreover, for example, the recording device 112a and the recording device 112b may be integrally formed with each other.

Furthermore, for example, all or some elements, aside from the angular sensor 132, which are to be installed in the band 201, may be installed in the band 201.

For example, a small display may be installed in the band 201 and a measurement result may be checked by the band 201 by itself. Furthermore, for example, a speaker and the like may be installed in the band 201 and a measurement result may be transmitted through voice.

[Modification 7]

Moreover, communication between the elements may be performed through wired communication or wireless communication. Furthermore, for example, the sensor data output from the sensor reception section 133 may be recorded on a removable medium, and may be input to the measurement processing unit 113 through the removable medium.

[Modification 8]

Moreover, the angular sensors 132 may operate in combination with one another, or may operate independently of one another. However, in the latter case, it is necessary to provide a mechanism, such as the sensor control section 131, for allowing the measurement timings of the angular sensors 132 to be synchronized with one another.

[Modification 9]

Furthermore, the inter-panel angles may be optionally adjusted, or the adjustment positions of the inter-panel angles may be fixed at a predetermined constant interval (for example, every 10°) using a clicking mechanism, a geared wheel and the like. In the former case, it is possible to measure the shape of an object to be measured more accurately. Furthermore, in the latter case, it is easy to maintain the entire shape of the band 201, for example, to easily measure an object to be measured having a concave-convex section as illustrated in FIG. 14.

[Modification 10]

Moreover, as illustrated in FIG. 17, a coupling section (an articulation) of the panel 211 may have allowance. That is, some degree of freedom may be provided to an interval between the panel 211 and the joint 212, thereby allowing the band 201 to wave up and down.

Consequently, it is possible to improve the mounting performance of the band 201 with respect to an object to be measured.

[Modification 11]

Furthermore, the shapes or designs of the panel 211 and the joint 212 may be arbitrarily employed. Moreover, it is not necessary to allow the shapes of all panels 211 to coincide with one another. For example, an interval between adjacent joints 212 may not be constant without unifying the widths of the panels 211.

[Modification 12]

Furthermore, for example, when the band 201 has been stretched in a straight line such as being suspended in a vertical direction, it may be possible to provide a function of checking whether each angular sensor 132 shows an appropriate value (0° or 180°, or allowing each angular sensor 132 to show an appropriate value.

[Modification 13]

Moreover, without using a measurement trigger, it may be possible to measure an inter-panel angle in realtime at a predetermined sampling interval, acquire sensor data, or measure the peripheral shape or the peripheral length of an object to be measured.

[Modification 14]

Furthermore, the mechanism for generating a measurement trigger as illustrated in FIG. 6 to FIG. 9 is for illustrative purposes only. Other mechanisms may be employed.

[Modification 15]

Moreover, for example, the band 201 may be installed in a belt wound around the waist and an abdominal girth may be normally measured. Consequently, for example, it is possible to simply and accurately understand a relation between daily diet and the abdominal girth.

[Modification 16]

Furthermore, when a generated measurement image is significantly different from an estimated shape of an object to be measured, a detection value of the angular sensor 132, which is significantly different from a detection value of another angular sensor 132, may be removed and a measurement image may be generated in consideration of the probability that a malfunction has occurred in an angular sensor 132. In this case, for example, the removed detection value may be interpolated using a detection value of another angular sensor 132 around the angular sensor 132 having the removed detection value.

[Modification 17]

Moreover, a mechanism (a mechanism for adjusting an inter-panel angle) of an articulation of the band 201 is not limited to the example illustrated in FIG. 3. For example, other mechanisms may be employed.

For example, in a band 401 of FIG. 18, the panels 211 are overlappingly connected through connection axes 411-1 to 411-n parallel to one another such that end portions of surfaces of adjacent panels 211 overlap. Then, the panels 211 are rotated about the connection axes 411-1 to 411-n, so that it is possible to individually adjust an angle between the adjacent panels 211.

The band 401 is mounted such that the edge of each panel 211 is brought into contact with an object to be measured.

Furthermore, as illustrated in the right side of FIG. 18, all panels 211 are folded to overlap, so that it is possible to compactly accommodate the band 401.

In addition, in the band 401, it is preferable to reduce the thicknesses of the panels 211 if possible in order to prevent an increase in positional deviation in the connection axis direction (a direction perpendicular to the plane of FIG. 18) between a starting point panel and an ending point panel.

Furthermore, for example, as indicated by a band 451 of FIG. 19, the panels 211 may alternately overlap in the vertical direction. Consequently, even when the thicknesses of the panels 211 are not reduced, it is possible to prevent the generation of the positional deviation in the connection axis direction between the starting point panel and the ending point panel.

As illustrated in the right side of FIG. 19, the band 451 is accommodated such that the panels 211 overlap in a zigzag manner.

[Configuration Example of Computer]

The series of processes described above may be performed by hardware or software. In the case of performing the series of processes by software, programs constituting the software are installed on a computer. The computer here may be a computer that is incorporated in dedicated hardware, a general-purpose personal computer, for example, that is capable of performing various functions by installing various programs, or the like.

FIG. 20 is a block diagram showing a configuration example of the hardware of a computer that performs the series of processes described above by programs.

In the computer, a CPU (Central Processing Unit) 601, a ROM (Read Only Memory) 602 and a RAM (Random Access Memory) 603 are connected to each other via a bus 604.

An input/output interface 605 is also connected to the bus 604. Furthermore, an input unit 606, an output unit 607, a storage unit 608, a communication unit 609 and a drive 610 are connected to the input/output interface 605.

The input unit 606 is configured from a keyboard, a mouse, a microphone or the like. The output unit 607 configured from a display, a speaker or the like. The storage unit 608 is configured from a hard disk, a non-volatile memory or the like. The communication unit 609 is configured from a network interface or the like. The drive 610 drives a removable media 611 such as a magnetic disk, an optical disk, a magneto-optical disk, a semiconductor memory or the like.

With a computer configured in the above manner, the series of processes described above is performed by the CPU 601 loading the programs recorded in the storage unit 608 on the RAM 603 via the input/output interface 605 and the bus 604 and executing the same, for example.

Programs to be executed by the computer (the CPU 601) are provided being recorded in the removable media 611 which is a packaged media or the like. Also, programs may be provided via a wired or wireless transmission medium, such as a local area network, the Internet or digital satellite broadcasting.

Then, the programs can be installed on the storage unit 608 via the input/output interface 605, by mounting the removable media 611 on the drive 610. Also, the programs can be received by the communication unit 609 via a wired or wireless transmission medium and be installed on the storage unit 608. Alternatively, the programs can be installed beforehand in the ROM 602 or the storage unit 608.

Additionally, the programs to be executed by the computer may be programs according to which processes are performed chronologically according to the order described in the present specification, or they may be programs according to which processes are performed in parallel or at necessary timing, such as when there is a call up.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below, for example.

(1)
A measurement apparatus including:
a band-shaped body in which a plurality of members are connected to one another through connection axes parallel to one another, and inter-member angles can be adjusted and detected, the inter-member angle indicating an angle between the members adjacent to each other through the connection axis; and
a measurement section that measures a peripheral shape based on the detected inter-member angle, the peripheral shape indicating a shape of at least a part of a periphery of an object to be measured on which the band-shaped body is mounted.

(2)
The measurement apparatus according to (1), wherein, when one end of the band-shaped body is brought into contact with a part of the band-shaped body, the measurement section measures the peripheral shape of the object to be measured based on the inter-member angle detected in a measurement range that indicates a range from the one end of the band-shaped body to a position at which the one end of the band-shaped body is brought into contact with the part of the band-shaped body.

(3)
The measurement apparatus according to (2), wherein the measurement section measures a peripheral length based on a length of each of the members in a longitudinal direction of the band-shaped body in the measurement range, the peripheral length indicating a length of the at least a part of the periphery of the object to be measured.

(4)
The measurement apparatus according to (1),
wherein each of the members is provided with an operation unit for setting a measurement range indicating a range of the band-shaped body used in measurement, and
wherein the measurement section measures the peripheral shape of the object to be measured based on the inter-member angle detected in the measurement range set by operating the operation unit.

(5)
The measurement apparatus according to (4), wherein the measurement section measures a peripheral length based on a length of each of the members in a longitudinal direction of the band-shaped body in the measurement range, the peripheral length indicating a length of the at least a part of the periphery of the object to be measured.

(6)
The measurement apparatus according to any of (1) to (5),
wherein each of the members has flexibility and is provided with a sensor for detecting a degree of bending of the member, and
wherein the measurement section measures the peripheral shape of the object to be measured based on the detected degree of bending of each of the members.

(7)
The measurement apparatus according to any of (1) to (6), wherein a sensor is provided on a surface, of at least one of the members, which is brought into contact with the object to be measured, to detect pressure between the member and the object to be measured at a time of mounting the band-shaped body.

(8)
The measurement apparatus according to any of (1) to (7), wherein a sensor is provided on at least one of the members to detect a position in a height direction of the member.

(9)
The measurement apparatus according to any of (1) to (8), wherein the measurement section measures the peripheral shape of the object to be measured based on a length of each of the members in a longitudinal direction of the band-shaped body, in addition to the inter-member angle.

(10)
The measurement apparatus according to any of (1) to (9), wherein the measurement section generates a measurement image indicating the peripheral shape of the object to be measured.

(11)
The measurement apparatus according to (10), further including:
a display control section that controls display of the measurement image.

(12)
A measurement method in a measurement apparatus including a band-shaped body in which a plurality of members are connected to one another through connection axes parallel to one another, and inter-member angles can be detected, the inter-member angle indicating an angle between the members adjacent to each other through the connection axis, the measurement method including:
detecting each inter-member angle at a time of mounting the band-shaped body on at least a part of a periphery of an object to be measured; and
measuring a peripheral shape based on the detected inter-member angle, the peripheral shape indicating a shape of the at least a part of the periphery of the object to be measured.

(13)
A program for causing a computer to perform a process of measuring a peripheral shape indicating a shape of at least a part of a periphery of an object to be measured based on inter-member angles detected when a band-shaped body is mounted on the at least a part of the periphery of the object to be measured, the band-shaped body including a plurality of members connected to one another through connection axes parallel to one another, and the inter-member angle indicating an angle between the members adjacent to each other through the connection axis and being adjustable.

(14)
A computer-readable recording medium recording the program according to claim 13.

The present technology contains subject matter related to that disclosed in Japanese Priority Patent Application JP 2011-108119 filed in the Japan Patent Office on May 13, 2011, the entire content of which is hereby incorporated by reference.

What is claimed is:

1. A measurement apparatus comprising:
a band-shaped body in which a plurality of members are connected to one another through connection axes parallel to one another, and inter-member angles can be adjusted and detected, the inter-member angle indicating an angle between the members adjacent to each other through the connection axis; and
a measurement section that measures a peripheral shape based on the detected inter-member angle, the peripheral shape indicating a shape of at least a part of a periphery of an object to be measured on which the band-shaped body is mounted.

2. The measurement apparatus according to claim 1, wherein, when one end of the band-shaped body is brought into contact with a part of the band-shaped body, the measurement section measures the peripheral shape of the object to be measured based on the inter-member angle detected in a measurement range that indicates a range from the one end of the band-shaped body to a position at which the one end of the band-shaped body is brought into contact with the part of the band-shaped body.

3. The measurement apparatus according to claim 2, wherein the measurement section measures a peripheral length based on a length of each of the members in a longitudinal direction of the band-shaped body in the measurement range, the peripheral length indicating a length of the at least a part of the periphery of the object to be measured.

4. The measurement apparatus according to claim 1,
wherein each of the members is provided with an operation unit for setting a measurement range indicating a range of the band-shaped body used in measurement, and
wherein the measurement section measures the peripheral shape of the object to be measured based on the inter-member angle detected in the measurement range set by operating the operation unit.

5. The measurement apparatus according to claim 4, wherein the measurement section measures a peripheral length based on a length of each of the members in a longitudinal direction of the band-shaped body in the measurement range, the peripheral length indicating a length of the at least a part of the periphery of the object to be measured.

6. The measurement apparatus according to claim 1,
wherein each of the members has flexibility and is provided with a sensor for detecting a degree of bending of the member, and
wherein the measurement section measures the peripheral shape of the object to be measured based on the detected degree of bending of each of the members.

7. The measurement apparatus according to claim 1, wherein a sensor is provided on a surface, of at least one of the members, which is brought into contact with the object to be measured, to detect pressure between the member and the object to be measured at a time of mounting the band-shaped body.

8. The measurement apparatus according to claim 1, wherein a sensor is provided on at least one of the members to detect a position in a height direction of the member.

9. The measurement apparatus according to claim 1, wherein the measurement section measures the peripheral shape of the object to be measured based on a length of each of the members in a longitudinal direction of the band-shaped body, in addition to the inter-member angle.

10. The measurement apparatus according to claim 1, wherein the measurement section generates a measurement image indicating the peripheral shape of the object to be measured.

11. The measurement apparatus according to claim 10, further comprising:
a display control section that controls display of the measurement image.

12. A measurement method in a measurement apparatus including a band-shaped body in which a plurality of members are connected to one another through connection axes parallel to one another, and inter-member angles can be detected, the inter-member angle indicating an angle between the members adjacent to each other through the connection axis, the measurement method comprising:
detecting each inter-member angle at a time of mounting the band-shaped body on at least a part of a periphery of an object to be measured; and
measuring a peripheral shape based on the detected inter-member angle, the peripheral shape indicating a shape of the at least a part of the periphery of the object to be measured.

13. A program for causing a computer to perform a process of measuring a peripheral shape indicating a shape of at least a part of a periphery of an object to be measured based on inter-member angles detected when a band-shaped body is mounted on the at least a part of the periphery of the object to be measured, the band-shaped body including a plurality of members connected to one another through connection axes parallel to one another, and the inter-member angle indicating an angle between the members adjacent to each other through the connection axis and being adjustable.

14. A computer-readable recording medium recording the program according to claim 13.

* * * * *